United States Patent [19]

Neiman

[11] Patent Number: 4,655,241

[45] Date of Patent: Apr. 7, 1987

[54] APPARATUS FOR SEALING DAMPERS

[75] Inventor: Michael R. Neiman, Allentown, Pa.

[73] Assignee: Damper Design, Inc., Bethlehem, Pa.

[21] Appl. No.: 811,812

[22] Filed: Dec. 20, 1985

[51] Int. Cl.⁴ .................... F16K 3/02; F16K 3/312; F16K 25/00

[52] U.S. Cl. .................... 137/240; 126/285 A; 138/94.3; 251/174; 251/328; 277/236

[58] Field of Search .................... 126/285 A; 137/240; 138/94.3; 251/326, 327, 328, 329, 172, 174, 176; 277/235 R, 236

[56] References Cited

U.S. PATENT DOCUMENTS

| | | | |
|---|---|---|---|
| 1,476,344 | 12/1923 | McGee et al. | 138/94.3 |
| 3,228,389 | 1/1966 | Lowe et al. | 251/172 |
| 4,022,241 | 5/1977 | Fox | 137/240 |
| 4,088,146 | 5/1978 | Hagar | 137/1 |
| 4,163,458 | 8/1979 | Bachmann | 251/172 |
| 4,176,673 | 12/1979 | Connor | 137/240 |
| 4,334,550 | 6/1982 | Connor et al. | 137/240 |
| 4,474,205 | 10/1984 | Dreyer et al. | 138/94.3 |
| 4,491,144 | 1/1985 | Dreyer et al. | 137/240 |
| 4,561,472 | 12/1985 | Dreyer et al. | 137/240 |

Primary Examiner—George L. Walton
Attorney, Agent, or Firm—Schwartz, Jeffery, Schwaab, Mack, Blumenthal & Evans

[57] ABSTRACT

An apparatus for sealing a flow control apparatus, such as a guillotine damper, is disclosed. The apparatus of the invention is particularly intended for dampers or other flow control devices utilizing pressurized sealing air to effect complete sealing. The closure member is of the type that moves completely out of the main fluid passageway when opened. Each of the two lateral seals, which cooperate with lateral edges of the closure member, includes an extended portion with a curved segment which takes the form of a cylindrical arc to stiffen each lateral seal against movement normal to the plane of the seal. This, in turn, allows considerable reduction in the clearances and gaps in the corners between the lateral seals and an entry seal to reduce the flow volume of the sealing air, to reduce the overall power requirements, and to reduce energy consumption.

18 Claims, 6 Drawing Figures

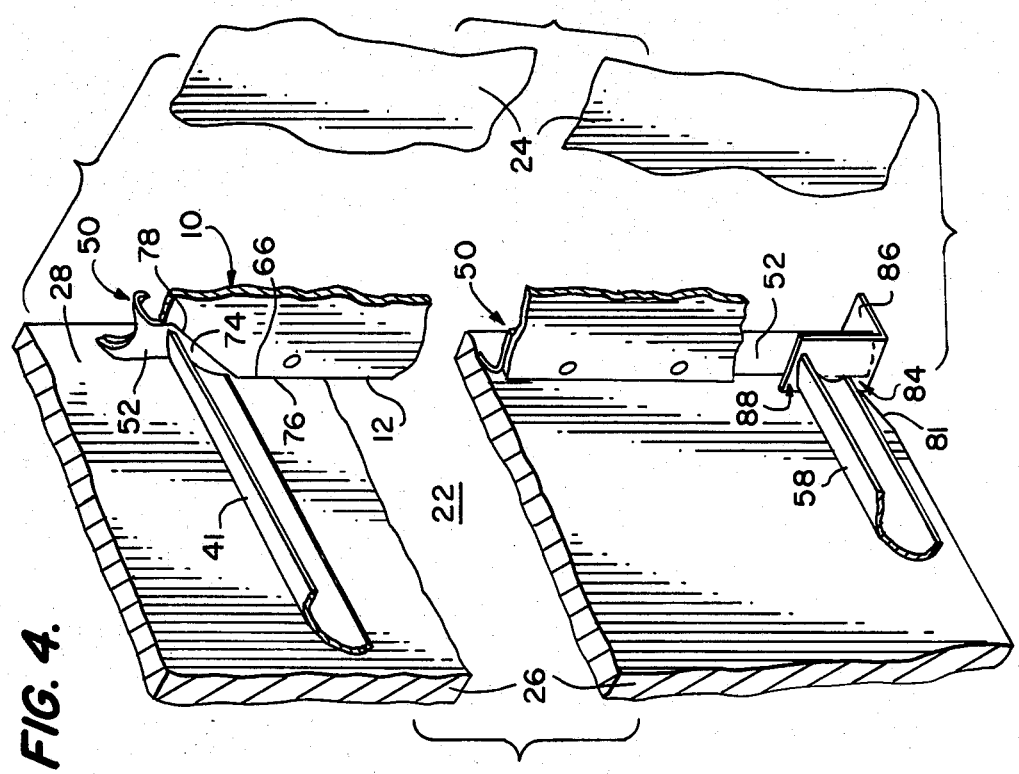
FIG. 4.
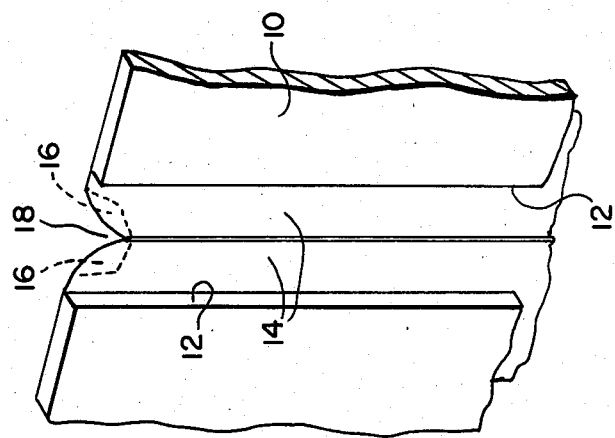
FIG. 1. (PRIOR DESIGN)

APPARATUS FOR SEALING DAMPERS

BACKGROUND OF THE INVENTION

1. Field of the Invention

This invention relates to the sealing of valves or dampers, such as guillotine dampers, in which a closure member is completely removed from the fluid stream. In particular, the invention relates to sealing of such flow control devices utilizing pressurized gas, preferably air. The sealing air bleeds through seals which cooperate with the sealing member to ensure that the closure member effects a complete seal with respect to the fluid to be controlled, such as hot flue gases.

2. Description of the Prior Art

Guillotine dampers in which the closure member or damper blade is removed entirely from the flow path when the damper is opened and inserted into the flow path when the damper is closed are known in the art. It is also known to seal such dampers with the use of pressurized sealing gas, usually air.

In providing seals between a chamber of pressurized sealing and the main flow passageway through the damper, problems occur in the corners between seals. One such set of corners are the corners between the entry seal, through which the damper blade initially moves into the main flow passageway, and a set of lateral seals flanking the main flow passageway and into which the lateral edges of the damper blade extend when the damper blade is moved into the closed position. If corner gaps are formed under various bending conditions of the seals in various positions of the damper blade, the flow volume, power requirements and energy usage for providing the sealing air is greater than if the gaps can be avoided or minimized.

OBJECTS OF THE INVENTION

Accordingly, it is an object of the present invention to eliminate or minimize gaps in the corners between the seals of a fluid control device utilizing pressurized sealing air to effect a complete seal of the closure with respect to the fluid to be controlled.

It is a related object of the present invention to reduce the required flow volume, size of pressurized air producing equipment and energy consumption in an air sealed flow control device.

It is also an object of the present invention to stiffen one end of each lateral seal in such an air sealed fluid control device against movement in directions generally parallel to the plane of the seal.

It is yet another related object of the present invention to bring the distal ends of an entry seal into close proximity with the lateral seals by providing an overall structure in which the lateral apertures for the seals may be widened in the region of the entry seals.

It is a further object of the present invention to provide, through widening of the lateral apertures in which the lateral seals are disposed, a clearance for the entry seal to move into and from curved conditions in close proximity to the adjoining lateral seals, to thus reduce leakage of sealing gas at the areas where the entry seal and the lateral seals come together.

These and other objects, advantages and aspects of the present invention will be more apparent from the detailed description and claims which follow with reference to the accompanying drawing.

SUMMARY OF THE INVENTION

The foregoing objects are achieved by an apparatus having lateral seals with a special curvature at one end of each such seal and having a widened area in the lateral aperture in which the seals are disposed at the location where the lateral seals adjoin an entry seal.

The overall damper or flow control apparatus incorporating the invention includes a body or seal support, a fluid passageway through the body or seal support, and a closure member cooperating with the body or seal support for sliding movement between a closed position, wherein the closure member extends into the passageway to restrict the flow of fluid therethrough, and an open position, wherein the closure member is withdrawn completely from the passageway, the closure member having a pair of opposed lateral edge regions on each side. The body or seal support has an entry side with an elongated entry aperture through which entry aperture the closure member is movable between open and closed positions. The body or seal support also has a pair of opposed lateral sides with elongated lateral apertures. The lateral edge regions of the closure member extend into the lateral apertures when the closure member is in a position other than the open position.

The entry aperture includes an elongated entry seal, which entry seal has a pair of opposite ends and which entry seal includes opposed, cooperating, flat entry sealing strips which overlap each other in sealing engagement when the closure member is completely withdrawn from the fluid passageway and which resiliently, sealingly engage the closure member by bending of the sealing strips into a bowed condition when the closure member is in a position other than the open position. Each of the lateral apertures includes an elongated lateral seal. Each lateral seal is of a similar construction and functions similarly to the entry seal. That is, each lateral seal includes opposed, cooperating, flat, lateral sealing strips which overlap each other in sealing engagement when the closure member is completely withdrawn from the fluid passageway and which resiliently, sealingly engage one of the lateral edge regions of the closure member by bending of the sealing strips into a bowed conditioned when the closure member is in a position other than the open position.

The body or seal support of the apparatus includes chamber means outside the fluid passageway. The entry and lateral seals separate the fluid passageway from the chamber means. The chamber means is for receiving pressurized sealing gas, which sealing gas bleeds through the seals to ensure complete sealing of the closure member with respect to the fluid in the fluid passageway.

Each lateral seal has a main section located generally in one plane when the closure member is in the open position. Each lateral seal also has an end section near the entry seal and a segment in the region of the end section, which segment is curved generally in the form of a cylindrical arc. This cylindrical arc has an axis generally parallel to the plane of the main section of the seal and perpendicular to the length of the seal. The curvature of the lateral seal stiffens the seal against movement in directions generally normal to the plane of the seal. This, in turn, permits the ends of the entry seal to closely adjoin the lateral seal by allowing the lateral apertures to be widened in the region of the entry seal. The widening of the lateral apertures provides clearance for the entry seal to move into and from curved conditions in close proximity to the adjoining lateral seals to thus reduce leakage of sealing gas at areas where the entry seal and the lateral seals come together.

The lateral aperture includes a widened area in registry with a part of the main section of the lateral seal, which widened area is near the curved segment of the seal, i.e., the segment which forms a cylindrical arc. Most of the length of each lateral aperture has the form of a slot. The widened area has the form of a flared area which diverges outwardly from the part of the lateral aperture having the form of a slot.

The flat sealing strips are preferably constructed of spring-tempered sheet metal. These strips are disposed in a pair of opposed stacks of strips and disposed in staggered relationship to one another such that the stacks of strips form a diverging pattern.

BRIEF DESCRIPTION OF THE DRAWINGS

FIG. 1 is an isometric fragmentary detailed view of a portion of the body and lateral seal with rolled-back corners of a prior design;

FIG. 4 is a fragmentary isometric view with various parts removed to show the cooperation between various seals at the corners of the flow control apparatus;

DETAILED DESCRIPTION

Figure 2:
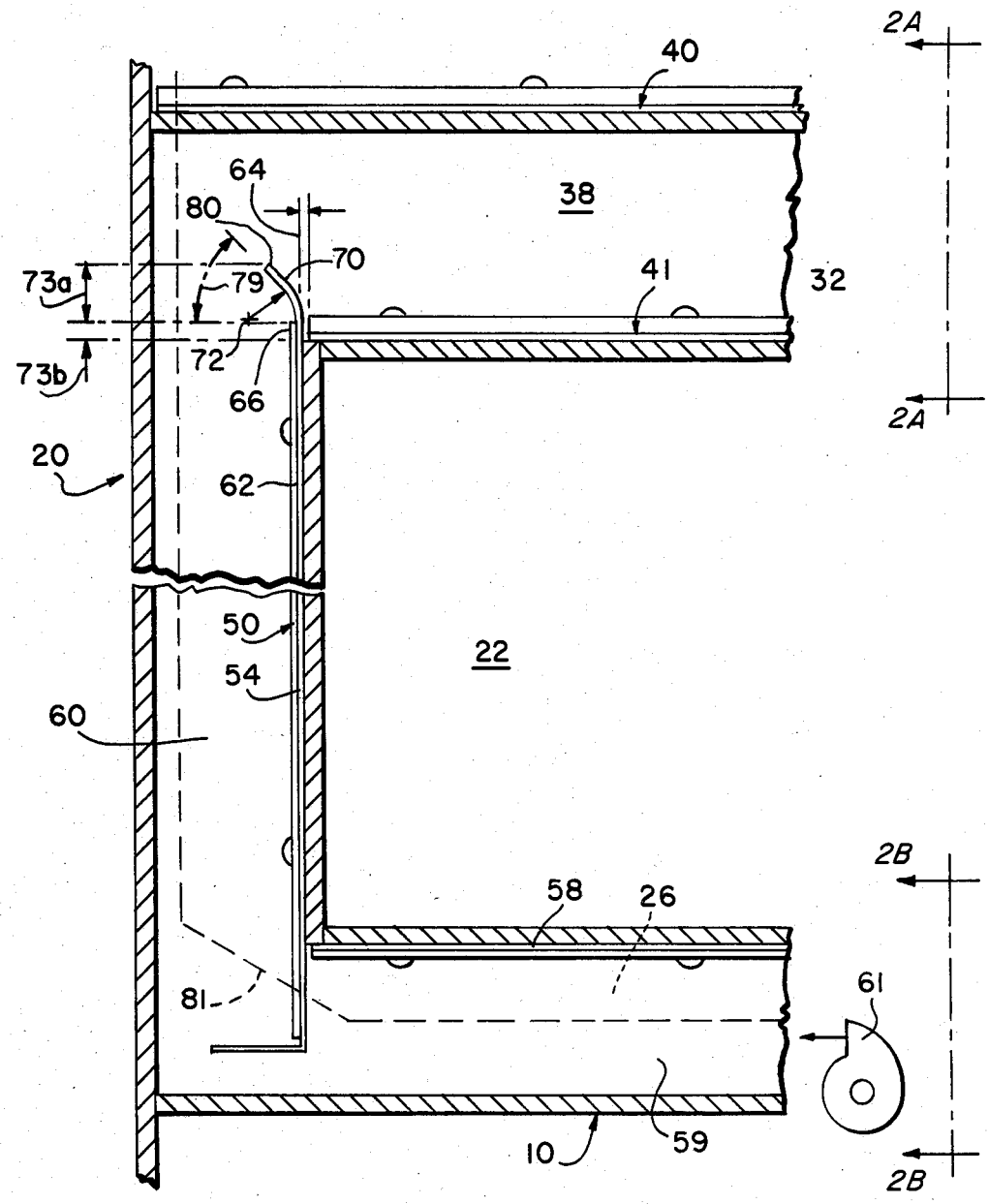
FIG. 2 is a fragmentary view in section through a flow control apparatus according to the present invention.

In the following description and in the drawing, like reference characters used among the various figures of the drawing, refers to like elements or features.

FIG. 1 depicts a prior design over which the present invention represents an improvement. In the prior design of FIG. 1, body 10 of a fluid controlling device, for example a damper, includes an elongated aperture 12 which cooperates with the lateral sides of a closure member, gate or guillotine damper blade (see FIG. 4 for a depiction of the damper blade in the context of the present invention.)

The elongated aperture 12 includes seals 14 which include overlapping strips to be described in more detail in connection with the description of the invention itself. The seals 14 engage the sides of a closure member to seal those sides with respect to fluid in a conduit to which the damper or fluid control device is connected.

At the end of the seals 14, where the closure member or blade first engages the seals 14 upon entry into the conduit or fluid passageway, a pair of rolled-over corners 16, the rolled-over portion being illustrated with broken lines in FIG. 1. These rolled-over corners have been necessary in order to ease the entry of the closure member or damper blade into the lateral seals 14 without damaging the seals. The rolled-over corners 16, however, leave a gap 18 in the corners between the entry seal and the lateral seals.

Because the seals are used in conjunction with pressurized sealing gas, preferably air under pressure, it is desirable to minimize leakage between the seals and the closure member. That is, a pressurized air chamber surrounds the seals outside the fluid passageway into which the closure member extends. Some bleeding of pressurized air through the seals and into the fluid passageway is expected. The pressurized air ensures a completely fluid-tight seal between the fluid being transported and the closure member. Nevertheless, it is desirable that this bleeding of air not be excessive and that it not be significantly greater in one region of the seal than in other regions. Excessive leakage in one area increases the air volume requirements for the pressurized sealing air, which, in turn, increases power requirements and energy consumption. Accordingly, it is desirable to reduce or eliminate gap 18 to thereby reduce the leakage of sealing air at the corners between seals.

In this regard, a contributing factor to formation of the gap 18 is that the entry seal, which will normally be perpendicular to the lateral seals and which is shown and described in connection with the improvement of the invention may, in the arrangement of FIG. 1, extends towards the sides of the damper only to a point until just before it contacts body 10 of the damper. In other words, heretofore the entry seal could not be moved so as to be immediately adjacent lateral seals 14 to thus reduce the leakage of sealing air in the corner between the entry and lateral seals.

Figure 3:
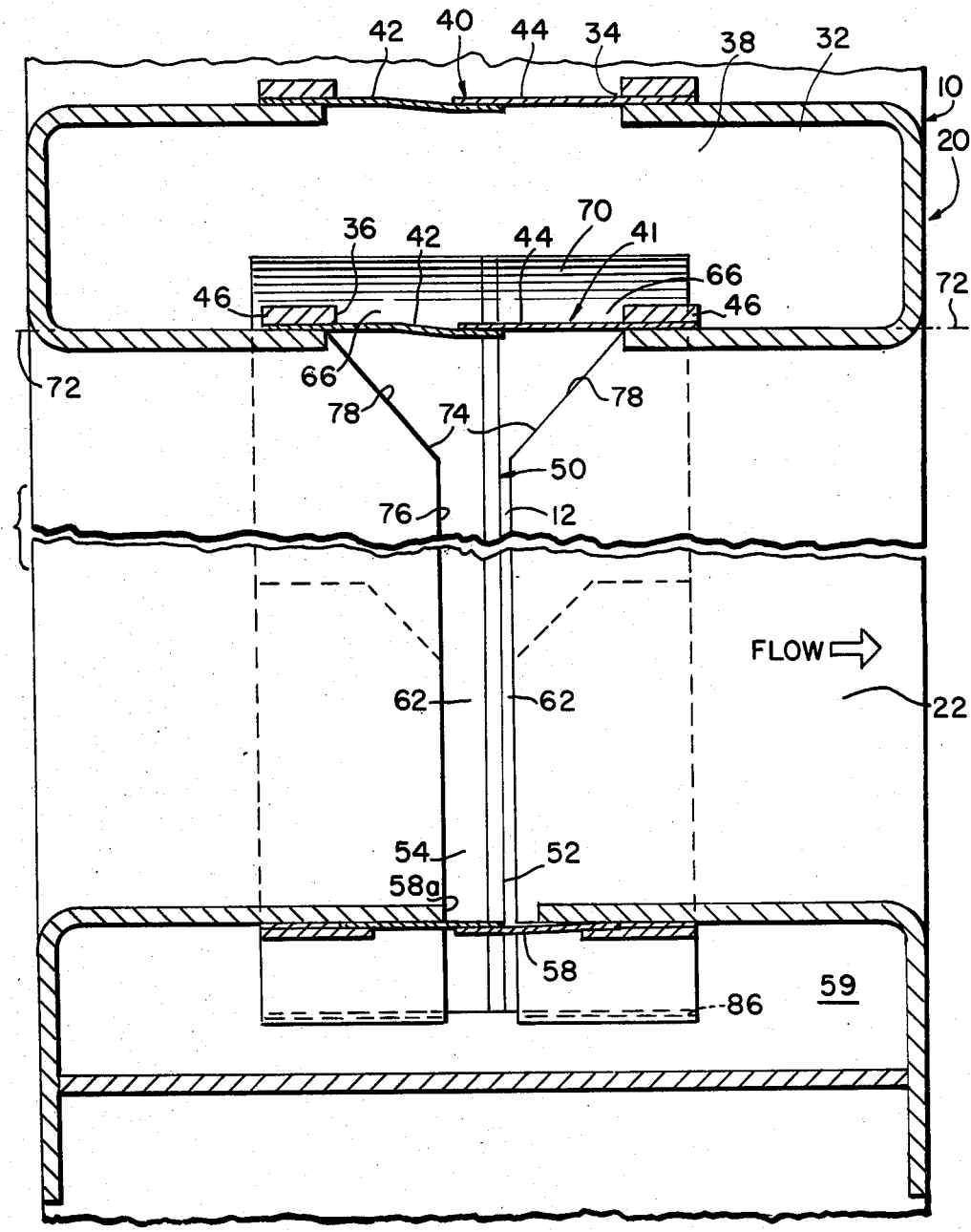
FIG. 3 is a fragmentary view, partially in section, of a flow control apparatus according to the present invention, the upper portion of FIG. 3 having been taken on the section line 2a—2a of FIG. 2 and the lower portion having been taken on the section line 2b—2b of FIG. 2.

Any effort to move the entry seals closer to the lateral seals through use of a widened area in the elongated aperture 12, such a widened area shown in FIGS. 3 and 4 in connection with the disclosure of the invention itself, has resulted in the lateral seals either being blown into the flow path or fluid passageway, i.e. into the interior of the damper, or has resulted in the seals fluttering. In the past, therefore, no such widened opening in the aperture was provided. The body 10 of the damper supported the seals 14 by utilizing a uniform, slot-shaped aperture 12 as shown in FIG. 1 to prevent the seals 14 from being blown into the flow path by the sealing air or from fluttering as a result of being subjected to the pressure and flow of the sealing air.

As already indicated, however, this has left a gap in the corners between the entry and lateral seals. The gap has resulted from both the rolling-over of the seals and from the inability to place the entry seal in immediate proximity to the lateral seal 14 in view of interference by the body 10 of the damper or flow control device. A solution could not be found by simply extending the lateral seals 14 higher than the entry seals, since, where the lateral seals would have extended above the entry seals, they would have been unsupported by the body 10 of the damper. This would, as already described, cause fluttering.

Turning from the prior design of FIG. 1 to the design of the present invention as shown in FIGS. 2-6, the damper or other flow control device is generally referred to by reference numeral 20, which device includes a body 10 as already described in connection with the prior design. Body 10 surrounds and defines a fluid passageway 22 through the body. Of course, fluid passageway 22 coincides with a passageway provided by a duct 24 (FIG. 4) such as for carrying hot, sooty flue gases from a power plant.

A closure member 26, which prefereably takes the form of a damper blade for a guillotine damper, includes a pair of lateral edge regions 28 only one of which is shown in FIG. 4. The other lateral edge region will be identical to the one shown. The term "lateral" as used in the context of lateral edge region 28, as well as in the context of lateral apertures, seals, etc. described herein, refers to the flanks of the device taken with respect to the movement of the damper blade 26 into and from its reclosed position. Thus, if the damper blade 26 were to enter the damper 20 from the side, the lateral edge regions, lateral apertures and lateral seals would be located one above the other, and yet they would still be considered as located in a "lateral" disposition.

Damper body 20 has an entry side 32 through which a damper blade 26 is movable between open and closed positions. Damper blade 26 moves between these positions with a sliding action. In the closed position, damper blade 26 extends into fluid passageway 22 to restrict the flow of fluid therethrough. Such closed position is shown in FIGS. 2 and 4. In the open position, the closure member 26 is withdrawn completely from fluid passageway 22, as reflected in FIG. 3 by the absence of the depiction of a closure member.

Entry side 32 includes a pair of entry apertures, i.e. an elongated upper entry aperture 34 sealed by seals 40 and an elongated lower entry aperture 36 sealed by seal 41. This enables the removal of the damper blade 26 not only from the fluid passageway 22 but also from the damper body itself and specifically from an upper sealing chamber 38 in which is disposed pressurized sealing air at the entry side 32 of the damper. Thus, when damper blade 26 is to be moved into the closed position, it first passes through upper aperture 34 by engaging with and opening seal 40, which allows the damper blade to sealingly move into chamber 38 containing the pressurized sealing air. As the damper blade continues its movement toward the closed position it will move through the chamber and contact and lower entry seal 41 through which seal 41 the blade 26 will move in a sealed condition into the fluid passageway 22 containing the fluid to be transported, such as flue gases. Each of the entry seals 40, 41 includes opposed strips 42, 44, and preferably opposed stacks of such strips. Such stacks of strips will be described in more detail in connection with the lateral seals of the present invention. Such strips are also shown and described in U.S. Pat. No. 4,088,146 issued May 9, 1978, which patent is hereby incorporated by reference.

Sealing strips 42, 44 are held in place by retainer members 46. Strips 42, 44 are opposed, cooperating flat strips which overlap each other in sealing engagement when the damper blade is completely withdrawn from the fluid passageway and which sealingly engage the closure member by bending of the strips into a bowed condition when the closure member is in a position other than the open position. This is shown in aforesaid U.S. Pat. No. 4,088,146 and as illustrated by the fragmentary view of seal 41 shown in FIG. 4 hereof. Although the strips 42, 44 are stacked, each individual strip is preferably composed of spring-tempered steel with a thickness of opproximately 0.004 inches.

Running perpendularly away from the entry seals 40, 41 are a pair of lateral seals 50 disposed in aforementioned elongated lateral apertures 12. These lateral seals flank the fluid passageway, one lateral seal 50 being depicted in FIGS. 2 and 3, the other being depicted in FIG. 4.

Figure 5:
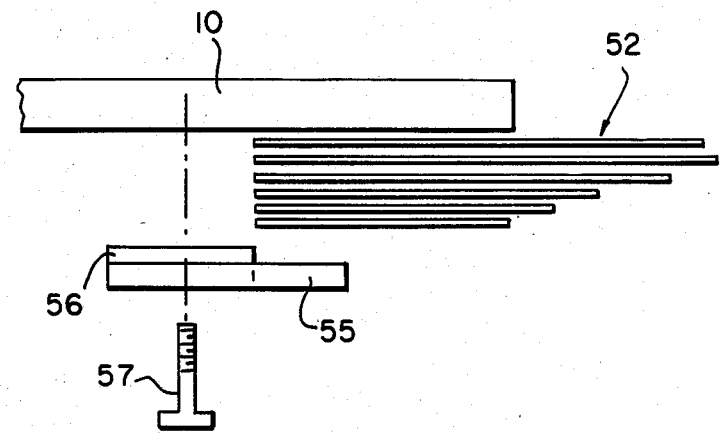
FIG. 5 is a fragmentary detailed elevation showing the diverging stack arrangement of the sealing strips of the seals.
Figure 6:
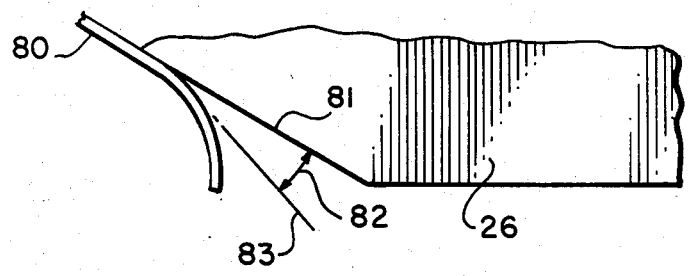
FIG. 6 is a fragmentary detailed view in elevation showing the cooperation between the leading edge of the damper blade, specifically the beveled edge at one corner thereof, and the curved segment of a lateral seal.

Each lateral seal 50 includes opposed, cooperating, flat, lateral sealing strips 52, 54 preferably composed of spring-tempered sheet metal as with strips 42, 44, although the strips 52, 54 will be stacked, each individual strip preferably has a thickness of approximately 0.004 inches. FIG. 5 illustrates the stack of strips 52, and it will be apparent that there are a pair of opposed stacks of strips forming each seal. At least one strip in each stack is positioned in staggered relationship with respect to another strip in the same stack, such that the stacks of strips form a diverging pattern. Strips 52 are held in place with respect to the damper body 10 by a retainer 55 which is spaced from the body 10 by a spacer 56, the entire assembly being held in place by a fastener 57.

As with the strips constituting the entry seals, the strips 52, 54 constituting the lateral seals 50 overlap each other in sealing engagement when the closure member is completely withdrawn from the fluid passageway. When the closure member or damper blade 26 is in a position other than the open position, i.e. when it is closed or partially closed, strips 52, 54 of each seal 50 sealingly engage a corresponding lateral edge region 28 of the closure member by bending of the sealing strips into a bowed condition (see FIG. 4.)

The damper 20 also includes a bottom seal 58 in elongated aperture 58a of body 10. Bottom seal 58 includes opposed, cooperating, flat lateral sealing strips which overlap each other in sealing engagement in a manner similar to the entry seals. Nevertheless, only one seal composed of such opposed strips is needed at the bottom, rather than two such seals at the entry side 32. The strips of bottom seal 58 sealingly engage the damper blade 26 by bending of the sealing strips into a bowed condition when the closure member extends entirely through the fluid passageway 22. In other positions of the damper blade, the strips of bottom seal 58 overlap each other in sealing engagement. As with the other strips, the strips of bottom seal 58 are preferably composed of spring-tempered sheet metal and are preferably disposed in a pair of opposed stacks of strips with the strips being in staggered relationship with respect to one another such that the stacks of strips form a diverging pattern. Each individual strip, i.e. each strip among several strips in a stack, again preferably has a thickness of approximately 0.004 inches.

The upper sealing chamber for pressurized sealing gas has already been described. The lateral seals 50 similarly define a boundary between a lateral chamber 59 for pressurized sealing air and the fluid passageway 22. The bottom seal 58 defines the boundary between the fluid passageway 22 and a bottom chamber 60 for pressurized sealing air.

Chambers 38, 59 and 60 are all joined together and, in effect, form a single chamber for pressurized sealing air, which chamber surrounds fluid passageway 24. It will be apparent that the damper blade 26, when in the closed position, extends into such composite pressurized sealing air chamber from all sides through apertures 12, 36 and 58a. That is, apertures 12, 36 and 58a form a continuous sealed opening extending entirely around fluid passageway 22. Air is introduced into the composite chamber so formed by blower 61 schematically shown in FIG. 2. The pressurized sealing air may bleed through the seals, i.e. seals 41, 50 and 58 to ensure a fluid tight sealing of the damper blade 26 with respect to the fluid passageway 22. Indeed, even with the damper blade 26 in the open position, entirely removed from both the fluid passageway 22 and from the upper sealing air chamber 38, pressurized air is still preferably supplied to the composite chamber formed by sealing air chambers 38, 59 and 60 to ensure that debris does not enter into these chambers as a result of hot and dirty gases or the like flowing through fluid passageway 22.

Each lateral seal 50 has a main section 62 located in generally one plane 64 when the damper blade is in the open position. Each lateral seal also has an end section 66 near the lower seal 41 for the lower entry aperture 36 and a curved segment 70 in the region of the end section 66. Segment 70 curves generally in the form of a cylindrical arc, i.e. part of a surface of a cylinder, which cylindrical arc has an axis 72 generally parallel to plane 64 of main section 62 of the seal 50 and perpendicular to the length of seal 50. Portion 66 extends beyond the plane of entry seal 41 so that curved segment 70 is disposed entirely beyond lower entry aperture 36 and seal 41 in a direction away from fluid passageway 22. That is, curved segment 70 is disposed entirely in sealing chamber 38. In a prototype, the end of seal 50 disposed in the sealing chamber 38 is at distance 73a which is approximately 0.74 inches beyond the seal 41 and an additional distance 73b which is approximately 0.25 inches beyond the closest force of body 10 in which aperture 36 is located.

Each lateral aperture 12 includes a widened area 74 in registry with part of the main section 62 of the lateral seal, which widened area 74 is adjacent to but inward of the curved segment 70 of the lateral seal 50. Specifically, most of the length of each lateral aperture 12 has the form of a slot 76, yet widened area 74 has the form of a flared area which diverges outwardly from the part of the lateral aperture 50 having the form of a slot. The widened aperture is shaped by a set of inclined edges 78 in the damper body 10, which inclined edges 78 extend outwardly from slot 76 preferably in straight diagonal lines diverging in a direction toward entry aperture 36. While the curved segment 70 is located outside main fluid passageway 22, widened area 74 is located within fluid passageway 22.

The curved segment 70 of each lateral seal 50 stiffens the seal against movement in directions generally normal to plane 64 of the seal. This, in turn, permits the ends of the entry seal to closely adjoin the lateral seal by allowing lateral apertures 12 to be widened in the region of the entry seal 41, as described. The widening of the lateral apertures 12 provides clearance for the entry seal, specifically, the lower entry seal 41, to move into and from a curved condition in close proximity to the adjoining lateral seals 50, to thus reduce leakage of sealing gas at areas such as shown in FIG. 4 where the entry seal 41 and lateral seals 50 come together.

Of course, this added stiffness effected by curved segment 70 prevents the blowing of the lateral seals 50 into the fluid passageway 22 as previously described and also prevents fluttering of the portion of the lateral seals 50 adjacent the entry seal 41. As also indicated, the widened area 74 permits the lower entry seal 41 to be moved closer to the lateral seals 50 to thus further reduce the gap between seals and to seal off leakage in the corners between the entry and lateral seals. Without widened area 74 the body 20 would be interposed between entry seal 41 and the lateral seals 50 which would increase the gap between these elements.

In the previous design it was preferred to leave 0.03 inches between the lower entry seal 41 and the part of body 20 on which the lateral seals 50 are mounted. Apart from that small clearance, however, a gap would also be left in the corners between lower entry seal 41 and lateral seals 50 corresponding to the thickness of the portion of the body 10 on which the lateral seals 50 are mounted. This gap is effectively eliminated leaving only a clearance of the 0.03 inches with respect to the lateral seals 50 themselves (rather than with respect to the body 20 on which the lateral seals are mounted), thus substantially reducing the gap in the corners adjacent lower entry seal 41. It will also be apparent that the gap 18 formed by the folded over corners of the prior device as shown in FIG. 1 has been eliminated as a result of curved segment 70, since curved segment 70 provides a stiffness to allow the lateral seals 50 to be extended up beyond the point at which the lateral seals meet the lower entry seal 41. In addition, curved segment 70 provides a smooth and rounded surface for initial engagement with the damper blade 26, which ensures a easy entry damper blade 26 between the strips of seal 41 without binding or damaging such strips. That is, the curvature of segment 70 ensures that the seals 50 will not break or crease upon contact with the damper blade 26.

The curvature of segment 70 should be smooth and gentle, i.e. it should not be too abrupt. The minimum radius of curvature is determined by the formula:

$$R = \frac{Et}{2S}$$

where
R = radius;
E = Young's modulus;
S = allowable bending stress; and
t = thickness of each individual leaf or strip of the stack of strips, regardless of how many.

This minimum radius ensures that the elastic limit is not exceeded. It ensures that the seals move back to the original position and do not develop fatigue points or creases.

It is preferable to exceed the minimum radius. For example, in a prototype, the minimum radius yielded by the foregoing formula was point 0.58 inches. To provide some margin of safety a radius of 0.62 inches was chosen. In such an instance the radius should not exceed 1 inch. With too large a radius the upper seal 40 would be blocked from fully bowing toward the lower entry aperture 36 in the manner intended. Flow of sealing air between the entry sealing chamber 38 and the lateral sealing chambers 59 could then be partially blocked.

As indicated, the curved segment 70 takes the form of a cylindrical arc 79. The arc 79 should be approximately 45° with an approximately constant radius. Following the curved portion, however, is an extension 80 which forms a tangent to the curved portion. The amount of arc must be more than 5° in order to provide sufficient stiffness in the curved portion 70.

As will be seen from FIGS. 2 and 4, the damper blade 26 preferably has beveled corners 81. The angle 82 between the beveled corner 81 and the tangent 83 of the curved segment 70 should be substantially less than 45° and preferably should fall in the range of 15°–30°. The bevel itself is disposed at an angle of approximately 30° with respect to the remainder of the leading edge of the blade 26.

At each bottom corner of the damper 20 is provided an L-shaped corner seat 84 which helps reduce gaps in the corners opposite the corners at the entry side 32. The L-shaped seat 84 includes a planar top leg 86 which provides a surface against which bottom seal 58 may closely pass to avoid any large gap. Also, extending well below the bottom aperture 58a, in generally the same plane as the bottom seal 58, is a bottom leg 88 of the L-shaped seat. The bottom end of lateral seal 50, specifically, the bottom end of strip 52 passes closely over bottom leg 88 as strip 52 is bowed into sealing engagement with the lateral edge region 28 of the damper blade 26. Again, this will keep any clearances through which sealing air might pass to a minimum and will avoid excess leakage of sealing air. Also, the L-shaped corner seat 84 prevents major leakage of sealing air in the event that the damper blade 26 does not fully seat in the closed position, i.e. it ensures that the beveled corner 81 will not accidentally provide a large opening for escape of pressurized sealing air.

The invention has been described by way of a preferred embodiment thereof, but many variations and modifications are possible. It will be understood that the invention is not limited by the foregoing description but rather is limited only by the scope of the appended claims.

What is claimed is:

1. An apparatus for controlling the flow of a fluid comprising:
   (a) a body;
   (b) a fluid passageway through said body;
   (c) a closure member cooperating with said body for sliding movement between a closed position, wherein said closure member extends into said passageway to restrict the flow of fluid therethrough and an open position, wherein said closure member is withdrawn completely from said passageway, said closure member having a pair of opposed lateral edge regions on each side;
   (d) said body having an entry side with an elongated entry aperture through which entry aperture said closure member is movable between the open and closed positions;
   (e) said body having a pair of opposed lateral sides with elongated lateral apertures, said lateral edge regions of said closure member extending into said lateral apertures when said closure member is in a position other than said open position;
   (f) said entry aperture including an elongated entry seal, which entry seal has a pair of opposite ends and which entry seal includes opposed, cooperating flat entry sealing strips which overlap each other in sealing engagement when said closure member is completely withdrawn from the fluid passageway and which resiliently, sealingly engage said closure member by bending of said sealing strips into a bowed condition when said closure member is in a position other than said open position;
   (g) each of said lateral apertures including an elongated lateral seal, each lateral seal including opposed, cooperating, flat, lateral sealing strips which overlap each other in sealing engagement when said closure member is completely withdrawn from the fluid passageway and which resiliently, sealingly engage one of said lateral edge regions of said closure member by bending of said sealing strips into a bowed condition when said closure member is in a position other than said open position;
   (h) said body including chamber means outside said fluid passageway, said entry and lateral seals separating said fluid passageway from said chamber means, said chamber means being for receiving pressurized sealing gas, which sealing gas bleeds through said seals to ensure complete sealing of said closure member with respect to the fluid in the fluid passageway;
   (i) each lateral seal having a main section located generally in one plane when said closure member is in the open position, each lateral seal also having an end section near said entry seal and a segment in the region of said end section which segment is curved generally in the form of a cylindrical arc, which cylindrical arc has an axis generally parallel to said one plane of said main section of the seal and perpendicular to the length of the seal;
   (j) whereby said curvature of said lateral seal stiffens said seal against movement in directions generally normal to said one plane of the seal which, in turn, permits the ends of the entry seal to closely adjoin said lateral seal by allowing said lateral apertures to be widened in the region of the entry seal, the widening of the lateral apertures providing clearance for the entry seal to move into and from curved conditions in close proximity to the adjoining lateral seals to thus reduce leakage of sealing gas at areas where the entry seal and the lateral seals come together.

2. The invention as claimed in claim 1, wherein each said lateral aperture includes a widened area in registry with a part of said main section of said lateral seal, which widened area is immediately adjacent said curved segment of said seal.

3. The invention as claimed in claim 2, wherein most of the length of each said lateral aperture has the form of a slot and said widened area has the form of a flared area which diverges outwardly from the part of said lateral aperture having the form of a slot.

4. The invention as claimed in claim 1, wherein said flat sealing strips are made of spring-tempered sheet metal.

5. The invention as claimed in claim 4, wherein said strips are disposed in a pair of opposed stacks of strips, at least one strip in each stack being positioned in staggered relationship with respect to another strip in the same stack such that the stacks of strips form a diverging pattern.

6. The invention as claimed in claim 5, wherein each lateral seal has a main section located generally in one plane when said closure member is in the open position, each lateral seal also having an end section near said entry seal, each lateral seal further having a segment in the region of said end section, which segment is curved generally in the form of a cylindrical arc, which cylindrical arc has an axis generally parallel to said one plane of said main section of the seal and perpendicular to the length of the seal.

7. An apparatus for controlling the flow of a fluid comprising:
   (a) a body;
   (b) a fluid passageway through said body;
   (c) a closure member cooperating with said body for sliding movement between a closed position, wherein said closure member extends into said passageway to restrict the flow of fluid therethrough, and an open position wherein said closure member is withdrawn completely from said passageway;
   (d) said body having an entry side with an elongated entry aperture through which entry aperture said closure member is movable between the open and closed positions;

(e) said body having a pair of opposed lateral sides with elongated lateral apertures, said lateral edge regions of said closure member extending into said lateral apertures when said closure member is in a position other than said open position;

(f) said entry aperture including an elongated entry seal, which entry seal includes opposed, cooperating flat entry sealing strips which overlap each other in sealing engagement when said closure member is completely withdrawn from the fluid passageway and which resiliently, sealingly engage said closure member by bending of said sealing strips into a bowed condition when said closure member is in a position other than said open position;

(g) each of said lateral apertures including an elongated lateral seal, each lateral seal including opposed, cooperating, flat, lateral sealing strips which overlap each other in sealing engagement when said closure member is completely withdrawn from the fluid passageway and which resiliently, sealingly engage one of said lateral edge regions of said closure member by bending of said sealing strips into a bowed condition when said closure member is in a position other than said open position;

(h) said body including chamber means outside said fluid passageway, said entry and lateral seals separating said fluid passageway from said chamber means, said chamber means being for receiving pressurized sealing gas, which sealing gas bleeds through said seals to ensure complete sealing with respect to the fluid in the fluid passageway; and (i) means for stiffening said seal against movement in directions generally normal to said one plane of the seal and for permitting the ends of the entry seal to closely adjoin said lateral seal by allowing said lateral apertures to be widened in the region of the entry seal, the widening of the lateral apertures providing clearance for the entry seal to move into and from their curved conditions in close proximity to the adjoining lateral seals to thus reduce leakage of sealing gas at areas where the entry seal and the lateral seals come together.

8. The invention as claimed in claim 7, wherein each said lateral aperture includes a widened area in registry with a part of said main section of said lateral seal, which widened area is immediately adjacent said curved segment of said seal.

9. The invention as claimed in claim 7, wherein most of the length of each said lateral aperture has the form of a slot and said widened area has the form of a flared area which diverges outwardly from the part of said lateral aperture having the form of a slot.

10. The invention as claimed in claim 7, wherein said flat sealing strips are made of spring-tempered sheet metal.

11. The invention as claimed in claim 7, wherein said strips are disposed in a pair of opposed stacks of strips, at least one strip in each stack being positioned in staggered relationship with respect to another strip in the same stack such that the stacks of strips form a diverging pattern.

12. A sealing arrangement for flow control apparatus of the type which uses a movable closure member comprising:
    (a) a body;
    (b) an elongated lateral aperture in said body;
    (c) an elongated lateral seal disposed in lateral aperture;
    (d) a fluid passageway through said body;
    (e) a closure member cooperating with said body for sliding movement between a closed position, wherein said closure member extends into said passageway to restrict the flow of fluid therethrough and an open position wherein said closure member is withdrawn completely from said passageway;
    (f) said body having an entry side with an elongated entry aperture through which entry aperture said closure member is movable between the open and closed positions;
    (g) said elongated entry aperture containing an elongated entry seal;
    (h) said lateral seal including opposed, cooperating, flat, lateral sealing strips which overlap each other in sealing engagement when said closure member is completely withdrawn from the fluid passageway and which resiliently, sealingly engage said closure member by bending of said seal into a bowed condition when said closure member is in a position other than said open position;
    (i) said body including chamber means outside said fluid passageway, said entry and lateral seals separating said fluid passageway from said chamber means, said chamber means being for receiving pressurized sealing gas, which sealing gas bleeds through said seals to ensure complete sealing of said closure member with respect to the fluid in the fluid passageway;
    (j) said lateral seal having a main section located generally in one plane when said closure member is in the open position, said lateral seal also having an end section near said entry seal, said lateral seal further having a segment in the region of said end section of said seal, which segment is curved generally in the form of a cylindrical arc, which cylindrical arc has an axis generally parallel to said one plane of said main section of said seal and perpendicular to the length of the lateral seal;
    (k) said aperture including a widened area in registry with a part of said main section which is immediately adjacent said curved segment of said seal;
    (l) whereby said seal is stiffened against movement in directions generally normal to said one plane of said main seal section in the region of said widened area of said aperture.

13. The invention as claimed in claim 12, wherein most of the length of each said lateral aperture has the form of a slot and said widened area has the form of a flared area which diverges outwardly from the part of the aperture having the form of a slot.

14. The invention as claimed in claim 12, wherein said flat sealing strips are made of spring-tempered sheet metal.

15. The invention as claimed in claim 12, wherein said strips are disposed in a pair of opposed stacks of strips, at least one strip in each stack being positioned in staggered relationship with respect to another strip in the same stack such that the stacks of strips form a diverging pattern.

16. A seal for an aperture into which a closure member selectively extends, the seal comprising:
    (a) a main section located generally in one plane and an end section adjoining said main section;

(b) opposed, cooperating, flat, elongated sealing strips in said main and end sections, which sealing strips assume a mutually overlapping sealing condition wheen the closure member is not disposed between said sealing strips and which sealing strips bend into a bowed condition for sealingly engaging the closure member when the closure member is disposed between said sealing strips, said sealing strips being disposed within an aperture in a seal support;

(c) a seal segment in the region of said end section, which seal segment is curved generally in the form of a cylindrical arc, which arc has an axis generally parallel to said one plane of said main section of the seal and perpendicular to the lengths of said sealing strips;

(d) said aperture including a widened area near the curved segment of the seal to reduce leakage of the sealing gas in the region of said end section;

(e) whereby said end seal section is stiffened against movement generally in directions generally normal to said one plane of said main seal section.

17. The invention as claimed in claim 16, wherein said flat sealing strips are made of spring-tempered sheet metal.

18. The invention as claimed in claim 16, wherein said strips are disposed in a pair of opposed stacks of strips, at least one strip in each stack being positioned in staggered relationship with respect to another strip in the same stack such that the stacks of strips form a diverging pattern.

* * * * *